Patented Aug. 15, 1950

2,519,013

UNITED STATES PATENT OFFICE 2,519,013

POLYETHYLENE STRUCTURES

Thomas Franklin Banigan, Kenmore, N. Y., assignor to E. I. du Pont de Nemours and Company, Wilmington, Del., a corporation of Delaware No Drawing. Application November 17, 1949,
Serial No. 128,027

5 Claims. (Cl. 260—33.2)

This invention relates to improvements in films, sheets, filaments, fibers, monofils and like structures of ethylene polymer.

There have recently appeared on the market films made from ethylene polymer as described in U. S. Patent No. 2,219,700, issued to Perrin, Paton and Williams. These films have excellent inherent moisture-proofness, good mechanical strength and are highly resistant to the action of many chemicals, thereby being very useful as wrapping materials and for protective purposes generally. Filaments, staple fibers, monofils and the like are described in U. S. Patent No. 2,210,-774, issued to Perrin, Paton and Williams.

Films, filaments, fibers, monofils, coatings, etc. of ethylene polymer, however, have a propensity to readily develop strong electrostatic charges which make them difficult to manipulate during manufacture and subsequent processing, such as spinning, knitting, weaving, slitting, printing, sealing, etc. By reason of their highly charged surfaces, these articles also accumulate heavy dust deposits which, of course, are very undesirable.

Then, too, ethylene polymer films are smooth and very flexible, and superimposed sheets of the material separate with difficulty, particularly when pressure, even though moderate, is applied. In continuous roll form, the films do not slide easily over automatic packaging machinery, resulting in very unsatisfactory operation.

An object of this invention, therefore, is to improve the surface characteristics of films, filaments, fibers, monofils, sheets, coatings, etc. of ethylene polymer whereby to enhance the slip thereof and to inhibit the accumulation of electrostatic charges thereon, without detracting from the flexibility, strength, moisture-proofness, chemical resistance, heat sealability, etc. of the ethylene polymer structures.

Another object is to modify films, filaments, fibers, monofils, sheets, coatings, etc. of ethylene polymer with an agent which functions both as an antistatic and as a slip-promoting agent for the ethylene polymer structure. Other objects will appear hereinafter.

These objects are realized by the present invention which, briefly stated, comprises applying to structures of ethylene polymer watersoluble alkyl aryl polyglycol ethers, which are hereinafter referred to as ethers, of the formula:

wherein R is a benzene ring substituted at least once by a member of the group consisting of alkyl and cycloalkyl radicals having at least four carbon atoms and mixtures thereof and $x$ is an integer from 6 to 25 inclusive, from aqueous solutions of said compounds, and thereafter drying said structures by any suitable expedient. These ethers are outstanding in that they thoroughly wet the ethylene polymer surface, resulting in a uniform, adherent coating application.

Any water-soluble alkyl aryl polyglycol ether of the general formula R—O—(CH$_2$CH$_2$O)$_x$—H, as defined hereinabove, is suitable for purposes of this invention. These compounds are readily prepared by reacting ethylene oxide with an alkyl and/or cycloalkyl substituted phenolic compound in the desired molecular ratio. It is readily understood that commercially available ethers are, of course, not always pure compounds but sometimes mixtures, particularly with reference to the ethylene oxide chain length. Representative alkyl and/or cycloalkyl substituted carbocyclic hydroxyl reactants are dibutyl phenol, octyl phenol, iso-octyl phenol, dodecyl phenol, p-tertiary butyl phenol, cyclohexyl phenol, diamyl phenol, ditertiary butyl - m - cresol. ditertiary butyl-p-cresol, mono-tertiary butyl-m-cresol, p-tertiary hexyl phenol, ditertiary hexyl phenol, nonyl phenol, etc. It is preferred that the ether contain from 8 to 14, inclusive, ethylene oxide groups.

The aqueous solution should contain from 0.25% to 10% by weight of the watersoluble alkyl aryl polyglycol ethers and should be applied in such amount that there will be deposited on each surface of the ethylene polymer structure from 2 to 50 milligrams of alkyl aryl polyglycol ether per square yard of film surface and preferably from 4 to 20 milligrams per square yard of film surface.

Application of the aqueous solution to the surface of the ethylene polymer structure may be accomplished by any convenient expedient such as dipping, spraying, brushing, roll coating, etc. The temperature of the coating bath is not critical but it should be such that the alkyl aryl polyglycol ether is dissolved or thoroughly dispersed. In general, the temperature should be maintained preferably below 45° C., but not lower than 0° C.

The following examples of preferred embodiments further illustrate the principles and practice of this invention. Although all examples refer to ethylene polymer films, the procedure is the same for filament structures. Percentage composition is by weight unless otherwise indicated.

EXAMPLE I

Melt-extruded ethylene polymer film 0.002" thick is passed through an aqueous solution containing 1.5% of an alkyl aryl polyglycol ether having the following formula:

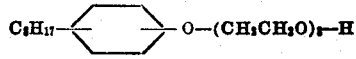

It is then passed between rubber squeeze rolls to remove the excess solution, and dried. The resulting film has good slip, with approximately 13.5 milligrams of ether per square yard of surface, showing 50 to 70% reduction from the film-to-film coefficient of friction of the uncoated film. The film is uniformly wetted and has practically no electrostatic propensity at 24% relative humidity, showing 70 to 90% reduction from the electrostatic propensity of the uncoated film. Heat seals (See Ubben U. S. Patent No. 2,147,180) were 1500+ grams—actually welded together—at 105° C.

The coefficient of friction of polyethylene film is determined as follows: A rectangular plate of metal linked to an indicator is placed on top of a sheet of polyethylene film supported on a smooth, flat surface. The sheet is then pulled under the metal piece and over the supporting surface at a steady rate. As the metal plate adheres to the moving film, it pulls on the indicator, the extent of the pull being in proportion to the friction between the plate and film. The coefficient of friction is somewhat higher when the film is first pulled under the block than when it is running steadily. The metal block will give a film-to-metal coefficient of friction and when the block is wrapped in several layers of film and then tested, a film-to-film coefficient of friction is obtained.

The electrostatic propensity characteristic of the film hereinafter set forth for purposes of comparison is measured as follows: A strip of film 1 inch by 10 inches in size is supported on, and in electrical contact with a flat slightly roughened stainless steel plate which is connected to a meter for measuring electrical potential, but which is otherwise insulated from its surroundings. The plate is roughened by rubbing it lightly with #100/120 Carborundum cloth, making very slight scratches at right angles to the direction of movement of the film. A weighted, felt-covered block which has a 1 inch by 2 inch face presses the film into contact with the stainless steel plate. An electrostatic charge is generated by pulling the film for a distance of 8 inches between the weighted block and the stainless steel plate, and the charge so generated on the film discharges on to the stainless steel plate with which it is in contact and is measured by the meter. The values registered on the meter (herein called electrostatic propensity) are purely relative and are useful only for purposes of comparison. They indicate the ability of a film to accumulate an electrostatic charge under the influence of friction normally encountered in manipulating or working with the film.

EXAMPLE II

Melt-extruded ethylene polymer film 0.001" thick is passed through an aqueous solution containing 1.5% of an alkyl aryl polyglycol ether having the following formula:

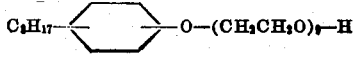

It is then passed between rubber squeeze rolls to remove the excess solution, and dried. The resulting film has good slip and very little electrostatic propensity.

EXAMPLE III

Melt-extruded ethylene polymer film 0.002 inch thick is passed through an aqueous solution containing 1.0% of an alkyl aryl polyglycol ether having the following formula:

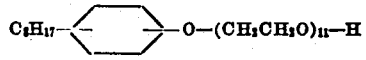

It is then passed between rubber squeeze rolls to remove the excess solution and dried. The resulting film has good slip, with approximately 9 milligrams of ether per square yard of surface, showing 70% reduction from the film-to-film coefficient of friction of the uncoated film. It is completely wetted, the appearance is good and it has very slight static propensity at 29% relative humidity, showing 85% reduction from the electrostatic propensity of the uncoated film. The following heat seals are obtained:

600 to 800 grams at 100° C.
1500+ grams—actually welded together at 105° C., 110° C. and 120° C.

showing that the ether has no adverse effect on the heat sealability of the film.

EXAMPLE IV

Melt-extruded ethylene polymer film 0.002" thick is passed through an aqueous solution containing 1.0% of an alkyl aryl polyglycol ether having the following formula:

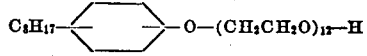

The excess solution is removed with rubber squeeze rolls, and dried. The resulting film shows good wetting, good slip, approximately 9 milligrams of ether per square yard of surface: a 70% reduction in film-to-film coefficient friction and a 90% reduction in electrostatic propensity.

EXAMPLE V

Melt-extruded ethylene polymer film 0.002" thick is passed through an aqueous solution containing 0.5% of an alkyl aryl polyglycol ether having the following formula:

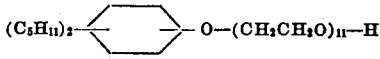

It is then passed between rubber covered squeeze rolls to remove the excess solution and dried. The resulting film, with approximately 4.5 grams of ether per square yard of surface, has good slip and a low electrostatic propensity.

EXAMPLE VI

Melt-extruded ethylene polymer film 0.002 inch thick is passed at room temperature through an aqueous solution containing 1.5% of an alkyl aryl polyglycol ether having the following formula:

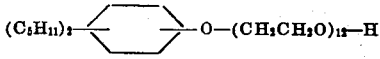

The excess solution is removed by means of rubber squeeze rolls and the film is dried. The resulting film has been properly wetted, it has good slip, with approximately 13.5 milligrams of ether per square yard of surface, showing 75% reduction from the film-to-film coefficient of friction of the uncoated film, good appearance and very low electrostatic propensity (90% reduction). A weld heat seal was obtained at 105° C., indicating no degradation by the treatment.

EXAMPLE VII

Melt-extruded ethylene polymer film 0.0015" thick is passed through an aqueous solution containing 1.0% of an alkyl aryl polyglycol ether having the following formula:

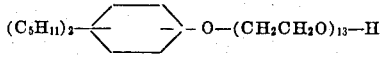

The coated film is dried after the excess solution is removed by means of squeeze rolls. Good wetting, good slip, approximately 9 milligrams of ether per square yard of surface—and a very low electrostatic propensity result.

EXAMPLE VIII

Melt-extruded ethylene polymer film 0.002 inch thick is passed through an aqueous solution containing 1.5% of an alkyl aryl polyglycol ether having the following formula:

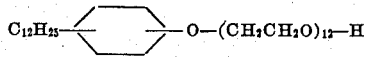

The excess solution is removed by rubber squeeze rolls and the film is dried. The film is nicely wetted, has good slip with approximately 13.5 milligrams of ether per square yard of surface (65% reduction in film-to-film coefficient of friction), good appearance and 80% reduction in electrostatic propensity at 31% relative humidity. The heat seal at 105° C. is a weld, indicating no adverse effects from the treatment.

EXAMPLE IX

Sheets of melt-extruded ethylene polymer film 0.002 inch thick are passed through baths containing different concentrations of the ether of Example VI, passed between squeeze rolls and thereafter dried. The results of differences in concentration are given in the following table:

*Table*

| Per Cent Ether in Bath | Ether on Film (mg./ square yard of surface) | Film-to-Film Coeff. of Friction | | Relative Electrostatic Propensity | |
|---|---|---|---|---|---|
| | | Reading | Per Cent Reduction | Reading | Per Cent Reduction |
| 0.0 | 0 | 2.3 | ------ | 400 | ------ |
| 0.5 | 4.5 | 1.16 | 50 | 73 | 82 |
| 1.0 | 9.0 | 0.73 | 68 | 42 | 89 |
| 1.5 | 13.5 | 0.64 | 72 | 32 | 92 |
| 2.0 | 18.0 | 0.52 | 77 | 24 | 94 |
| 3.0 | 27.0 | 0.42 | 82 | 16 | 96 |
| 4.0 | 36.0 | 0.32 | 86 | 14 | 97 |

EXAMPLE X

Melt-extruded ethylene polymer film 0.003" thick is passed through the 1.5% aqueous solution of Example VI, excess bath removed and dried. Good slip, with approximately 13.5 milligrams of ether per square yard of surface (a 70% reduction in film-to-film coefficient of friction), good appearance, low electrostatic propensity (a 90% reduction), good wetting and a weld heat seal at 105° C. result.

EXAMPLE XI

Melt-extruded ethylene polymer film 0.004" thick which is treated with the 1.5% aqueous solution of Example VI in the usual manner. The dried film has good slip, (70% reduction in film-to-film coefficient of friction) 13.5 milligrams of ether per square yard of surface, satisfactory appearance, a weld heat seal at 105° C. and low electrostatic propensity (a reduction of 90%).

EXAMPLE XII

Melt-extruded ethylene polymer film 0.0025" thick is treated with an aqueous solution containing 3.0% of the ether of Example VI, in the usual manner. The resulting film is satisfactory with regard to slip (80% reduction in film-to-film coefficient of friction), appearance, electrostatic propensity (95% reduction) and heat sealability.

As many widely different embodiments may be made without departing from the spirit and scope of my invention, it is understood that said invention is in no way restricted save as set forth in the appended claims.

I claim:

1. Structures of ethylene polymer the surfaces of which have uniformly distributed thereon as an anti-static and slip promoting agent a water-soluble alkyl aryl polyglycol ether of the formula:

wherein R is a benzene ring substituted at least once by a member of the group consisting of alkyl and cycloalkyl radicals having at least four carbon atoms and mixtures thereof, and $x$ is an integer from 6 to 25 inclusive.

2. Ethylene polymer structues having uniformly distributed thereon from 2 to 50 milligrams per square yard of film surface of a water-soluble alkyl aryl polyglycol ether of the formula:

wherein R is a benzene ring substituted at least once by a member of the group consisting of alkyl and cycloalkyl radicals having at least four carbon atoms and mixtures thereof, and $x$ is an integer from 6 to 25 inclusive.

3. Ethylene polymer structures having uniformly distributed thereon from 4 to 20 milligrams per square yard of film surface of a water-soluble alkyl aryl polyglycol ether of the formula:

wherein R is a benzene ring substituted at least once by a member of the group consisting of alkyl and cycloalkyl radicals having at least four carbon atoms and mixtures thereof, and $x$ is an integer from 6 to 25 inclusive.

4. Ethylene polymer structures having uniformly distributed thereon from 2 to 50 milligrams per square yard of film surface of a water-soluble alkyl aryl polyglycol ether of the formula:

wherein R is a benzene ring substituted at least once by a member of the group consisting of alkyl and cycloalkyl radicals having at least four carbon atoms and mixtures thereof, and $x$ is an integer of from 8 to 14 inclusive.

5. Ethylene polymer structures having uniformly distributed thereon from 4 to 20 milligrams per square yard of film surface of a water-soluble alkyl aryl polyglycol ether of the formula:

wherein R is a benzene ring substituted at least once by a member of the group consisting of alkyl and cycloalkyl radicals having at least four carbon atoms and mixtures thereof, and $x$ is an integer of from 8 to 14 inclusive.

THOMAS FRANKLIN BANIGAN.

No references cited.